June 1, 1943.  I. COWLES  2,320,812
CONDUIT AND COUPLING THEREFOR
Filed July 22, 1940  2 Sheets-Sheet 2
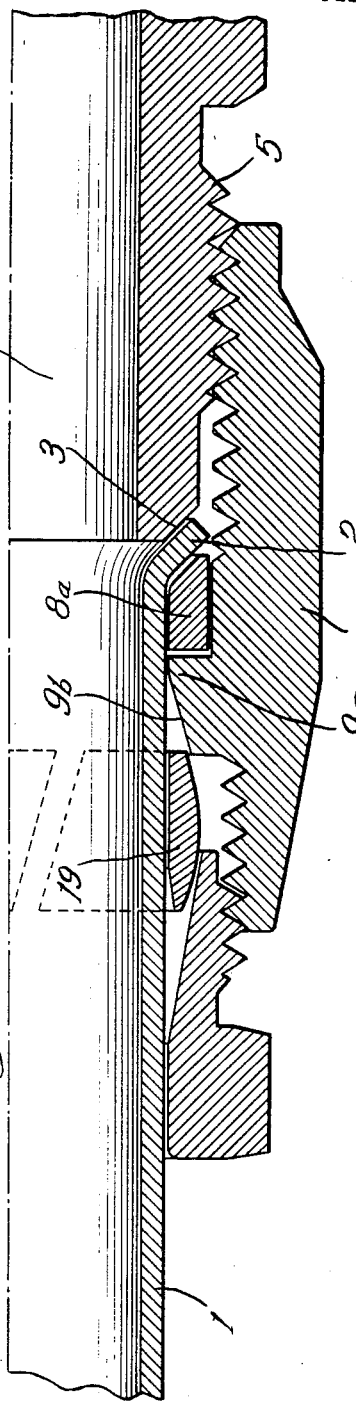
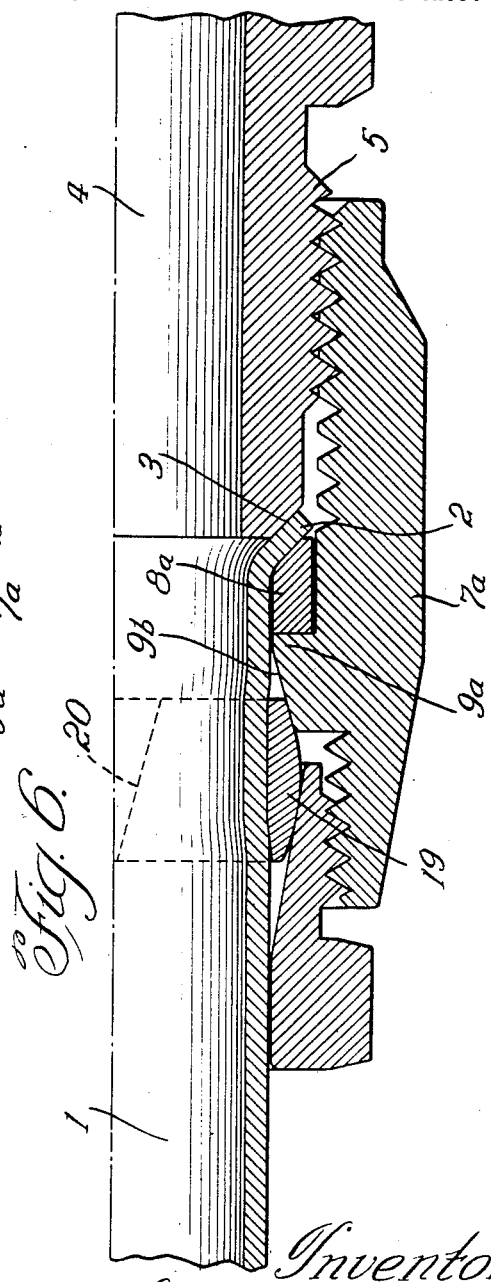
Inventor:
Irving Cowles
By Rudolph Wm. Lotz
Atty.

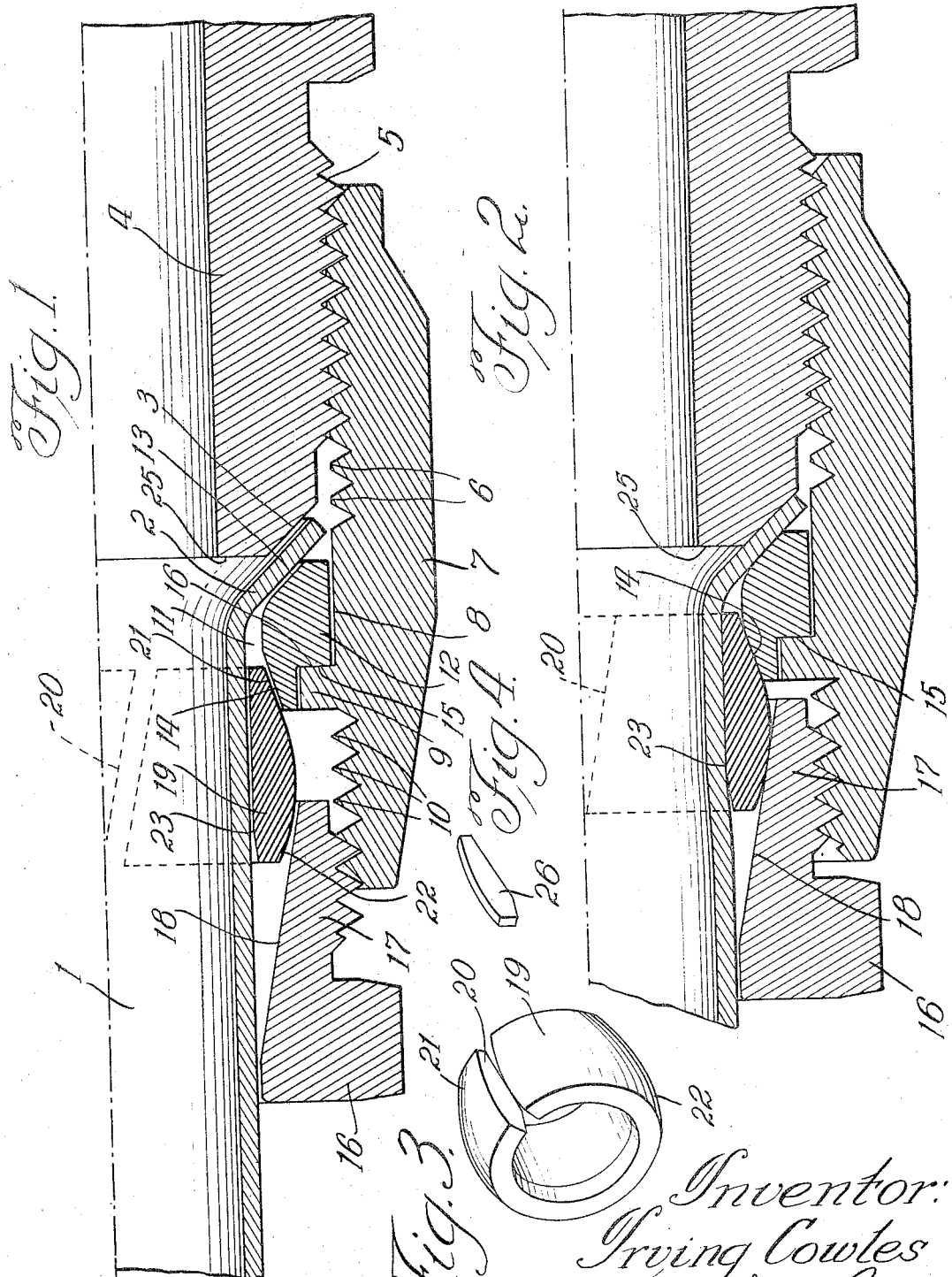

Patented June 1, 1943

2,320,812

UNITED STATES PATENT OFFICE 2,320,812

CONDUIT AND COUPLING THEREFOR

Irving Cowles, Detroit, Mich., assignor to himself and Rudolph W. Lotz, Chicago, Ill., as successor cotrustees of Utility Patents Trust Application July 22, 1940, Serial No. 346,711

9 Claims. (Cl. 285—86)

This invention relates to improvements in conduits and couplings for the same and has for its main object to provide a conduit which is maintained leak-proof against the causes most commonly responsible for causing leakage and which, furthermore, is preserved against causes of fracture thereof, whereby long life of the conduit is assured.

The invention is particularly designed and adapted for embodiment into metallic conduits wherein the tubing is of such thin walled type as is incapable of being threaded for engagement with threaded fittings and which, by reason of the thin nature of its walls is subject to fracture responsively to vibration and tensile stresses.

More particularly still, the invention is designed for embodiment in combination with tubing having flared end portions to be associated with couplings of what is known as the standard S. A. E. type which is well-known to all persons engaged in the mechanical arts wherein conduits are used and has for its further particular objects to provide couplings for said flared end tubing which include each the standard male member without change, equipped with a seat formation upon which a flared end of the tube is adapted to seat, and a female member equipped with means for maintaining a fluid tight joint between the tube and said male member together with means for relieving the flared end of the tube of tension and vibration stresses, preventing leakage at said joint responsively to forces, such as vibration and temperature changes which tend to loosen the threaded connection between the male and female members, and the accomplishment in a very simple, cheap and efficient manner of other vital fracture prevention means whereby the life of the tubing and the conduit as a whole is greatly increased, all as hereinafter more particularly pointed out.

Suitable embodiments of the invention are illustrated in the accompanying drawings wherein:

Fig. 1 is a fragmentary detail central longitudinal sectional view of a tube equipped with a coupling constructed in accordance with the invention, showing the parts in position preparatory to disposing the same in the relative positions wherein the objects of the invention are attained.

Fig. 2 is a view similar to Fig. 1 showing the component parts of the structure disposed in the relative positions wherein the objects of the invention are attained.

Fig. 3 is a detail perspective view of a contractible split collar constituting an essential element of the structure of Figs. 1, 2, 5 and 6 respectively.

Fig. 4 is a detail perspective view of a shim or filler for insertion into the slot of the collar for limiting the degree of contraction thereof fixed by the width of the slot of said collar.

Figs. 5 and 6 are views similar to Figs. 1 and 2 respectively, illustrating a slightly modified embodiment of the invention.

In Figs. 1 and 2 there is illustrated an embodiment of the invention which comprises the tube 1 equipped with a flared flange 2 seated upon the seat formation 3 of the male member 4 of the coupling. The latter is equipped with external threads 5 to engage the internal threads 6 of the female member 7. Said male member may be an integral part of a fitting such as an elbow, T-coupling or cross-coupling commonly used in the art to which the invention relates.

In the standard S. A. E. couplings, the female member is disposed loosely upon the tube 1 and is equipped at the end opposed to the seat 4 with a seat formation between which and the seat 3 the said flange 2 is clamped to provide a sealed joint. This joint is subject to leakage by the loosening of the female member under the influence of vibration and temperature changes as is well-known to those skilled in the art.

The loose fit of the female member upon the tube 1 is due to the fact that allowance must be made for tolerance variations in diameter of the tubing of any given size which, for example, in a tube 1 of one-half inch outer diameter, is about five thousandths of an inch plus or minus.

Thus in the great majority of instances there remains a relatively minute annular space between the cylindrical bore of the female member or nut and the tube 1, above the seat formation thereof. This bore portion of the nut is made of relatively great length in order to limit lateral movements of the tube 1 relatively to said nut and to take up some of the vibration to which the tube is most commonly subjected. Such vibration or other lateral stresses are concentrated mainly at the junction of the flange 2 with the body portion of the tube 1 and cause fractures in that zone. In instance of more or less intense vibration of the tube 1, the latter slaps against the outer end of the said bore of the female member and causes crystallization of the tube 1 at this point which results in fractures.

It is also well known that in driving the nut or female member home into very firm clamping relation to the flange 2, the rotation of the seat formation of said nut or female member after initial contact with the flange 2, effects appreciable thinning and weakening of said flange 2 which, in addition to being subjected to the aforesaid vibration stresses, is also subjected to very appreciable tensile stresses which also tend to produce fractures.

It is the main object of the present invention to provide very simple, cheap and efficient means for, viz.

*First.*—Relieving the flange 2 of the tube of all stresses to which it is subject.

*Second.*—Preventing loosening of the flange 2 relatively to the seat 3 under the influence of vibration and temperature changes.

*Third.*—To obviate the thinning of the flange 2, by the clamping thereof upon the seat 3, and

*Fourth.*—To provide means whereby the tube 1 is decreased in diameter to a predetermined degree at a predetermined point and to provide means whereby that degree of decrease in diameter may be varied.

In the structure of Figs. 1 and 2, the female member 7 is provided with an axial cylindrical bore portion 8 of a diameter equal to that of the crown portions of the threads 6 thereof. Said member 7 is further provided between its ends with an internal annular flange 9 which borders the bore portion 8 and also borders the threaded portion 10 of said member. The inner edge of said flange 9 is spaced appreciably from the tube 1 with which it is substantially concentric.

The bore portion 8 cooperates with the flange 9, the tube 1 and its flange 2 to define an annular space 11 which houses an unsplit ring or collar 12 which is externally cylindrical of smaller inner diameter than the tube 1 and of smaller outer diameter than the bore portion 8 and is of such thickness and made of such material that it cannot be expanded by the force to which it is subjected as pointed out hereinafter.

Said collar 12 is provided with a tapered lower end surface or seat formation 13 which is adapted to engage the flange 2 for cooperation with the seat 3 to clamp the said flange 2 into fluid tight relation to said seat 3.

The bore of the collar 12 between the surface portion 13 thereof and its upper end portion may be of any desired shape but is shown as bellied inwardly while the upper end portion of said bore is flared as at 14 at a slight angle to the axis of said collar, as, for example, ten to fifteen degrees, the upper end of said flared portion being opposed to a reduced outer diameter portion of said collar 12 bordering a shoulder 15 thereof which is, in turn, opposed to the flange 9 of the female member, the said portion 14 of the collar being of smaller diameter than the inner diameter of the flange 9.

Obviously by rotating the female member in one direction the said collar 12 will be forced against the flange 2 of the tube 1 to provide the aforesaid fluid tight joint, the movement of said collar toward and into clamping relation to the flange 2 being free of any rotation of said collar.

The male nut 16 is equipped with an externally threaded shank 17 engaged with the threads 10 of the female member, said shank being equipped with a tapered bore 18 extending into the nut 16 and which is of largest diameter at the extremity of said shank.

A split collar 19 equipped with an angularly disposed longitudinal slot 20 throughout its length, is disposed to project at one end portion into the tapered bore portion 14 of the collar 12, and at its other end portion into the mouth portion of the tapered bore 18 of the nut 16.

The slot 20 of said collar 19 is made of a predetermined width for the purpose of limiting its contraction by cooperation of its outer surface portions with the tapered bores 14 and 18 when the nut 16 is rotated in one direction.

The said collar is made of a resilient metal of such hardness that said collar cannot be distorted otherwise than contracted by the forces to which it is subjected. The normal inner diameter of said collar 19 is such that it will snugly fit the tube 1, as in some instances, by slight expansion thereof.

Said bore of said nut is cylindrical from its lower end, to a point adjacent to but spaced appreciably from its upper end and is slightly flared from this point to its upper end at an angle of five degrees, more or less, to the axis of said collar.

The taper of the lower end portion 21 of the outer circumferential face of said collar 10 corresponds with the tapered bore portion 14 of the collar 12 and the upper end portion 22 of said outer face of said collar 19 converges inwardly from a point slightly spaced from the middle point of said collar 19 arcuately so that only an annular substantially line-surface of said last-named surface portion 22 contacts the bore 18 of the nut 15, said bore portion 18 being of a taper of about ten to fifteen degrees to the axis of said 16.

Contraction of the collar 19 is effected by rotation of the nut for movement thereof toward the flange 2 of the tube, this rotation being effected after the female member is in its flange clamping position. Such contraction of the collar 19 occurs simultaneously with its movement along the tube 1 toward the flange 2 and is progressive until the same has been contracted to the limit of movement predetermined by the width of the slot 20. When thus fully contracted the inner diameter of the collar 19 will be less than the normal diameter of the tube 1 and thus the latter is contracted progressively from practically the instant of initial contraction and movement of said collar through a length of the tube greater than the length of said collar as indicated by the point 23 at which contraction begins to the lower end of the collar 19 which remains disposed in the position where its contraction is complete.

From the point 23 to the upper end of the cylindrical bore of the collar 19 the contraction of the tube 1 is extremely gradual while at the point opposed to the lower end of the collar 19 the contraction produces in the tube a very shallow somewhat tapered annular shoulder 24 which, in the instance illustrated, merges into the throat of the tube inwardly of the flange 2 and prevents movement of the tube 1 away from the male member 4 and thus relieves the flange 2 of any tensile stress to which the same might be subjected.

The gradual taper of the contracted portion of the tube 1 from point 23 to the end of the opposed point in the cylindrical bore of the collar 19 causes vibration stresses to which the tube I is subjected, to be distributed over an appreciable length of the tube and over an appreciable surface portion of the flared mouth of the collar 19, this being true also of the slight lateral stresses permitted by the small diameter bore of the nut 16 along its upper end, thus preventing fractures within the zone of contraction of the tube I for at least a much longer period than is true in the case of the standard type of conduit to which reference is made hereinabove.

After the collar 19 has been fully contracted, the nut 16 may still be rotated to a limited extent to obtain a strong wedge-like hold on said collar which cooperates with tensile friction between the threads of the nut and those of the member 7 to absolutely prevent loosening of the nut 16 responsively to vibration and temperature changes.

It will be noted that the seat 3 of the male member I is bordered by a shoulder 25 and that the bore of the mole member is of smaller diameter than the inner diameter of the tube I. This is standard practice in order to prevent contraction of the seat 3 responsively to the great pressure to which the latter is subjected. The bore of the member I determines the volume of flow of liquid through the conduit and such volume of flow must be maintained by avoiding contraction of the tube by the collar 19 to the requisite degree as determined by the width of the slot 20 of said collar.

Obviously the tube I may be contracted so that in the zone of contraction its inner diameter is rendered equal to that of the bore of the member 4 and in instances where the tube I is required to be more or less frequently disassociated from the member 4 it may be desirable to increase the degree of contraction of the tube I by the collar 19 upon each re-association of the tube with the member 4. To this end the width of the slot 20 of the collar may be such as to limit the contraction of the latter to the degree necessary to contract the portion of the tube embraced thereby to the diameter of the bore of the member 4 and provide shims or other fillers 26 (Fig. 4) of gradually decreasing thicknesses, for insertion into the slot 20 while the nut 16 is completely disassociated from the member 7, thus to limit contraction of the collar 19 step by step to effect successively increasing degrees of contraction of the tube I until the limit fixed by complete contraction of the slot 20 has been reached.

In the structure of Figs. 5 and 6 the only changes from that of Figs. 1 and 2 lies in the fact that the collar 8a which engages the flange 2 of the tube I is cylindrical internally and externally, and has its outer end engaged with the internal flange 9a of the female member 7a, said flange 9a being equipped with the inner tapered surface 9b the lower end of which is spaced only slightly from the tube I. The said tapered surface is engaged by the split collar 19 which corresponds with that of Figs. 1, 2 and 3 as does also the remainder of the structure, the results obtained being identical with those obtained by the structure of Figs. 1 and 2.

The structures of Figs. 1 to 6 inclusive comprising the members 7 and 7a, 8 and 8a, 16 and 19 together with shims 26, may be manufactured and sold to replace standard S. A. E. sleeve nuts for association with male members 4 instead thereof where the purchaser desires a safer and longer lived conduit assembly, the latter being particularly desirable for transmission of volatile inflammable fluids as in all type of automotive vehicles for travel on land and sea and in the air.

The structures of Figs. 1 and 2 and Figs. 5 and 6, respectively, are preferred for use in connection with tubes I of large diameters as, for example, in excess of five-eighths of an inch outer diameter.

I claim:

1. In a tube coupling, a male member equipped with a seat for the flared end of a tube, a female member having threaded engagement with the male member and adapted to embrace a portion of the tube, a radially contractible longitudinally non-collapsible collar slidably mounted upon the tube and gapped longitudinally to a predetermined degree for limiting contraction thereof to an inner diameter only slightly less than that of said tube for limiting the contraction of the tube by said collar, and a device associated with said collar and said female member and rotatable with respect to the latter and said collar for effecting progressive contraction of said collar and simultaneously therewith disposing the same in a predetermined position longitudinally of the tube when said collar has attained the limit of its contraction, the bore of said collar being flared along its outer end portions, said female member being free from engagement with the tube flange.

2. A conduit coupling comprising a member equipped with a seat for an end of a tube, a nut having threaded engagement at one end with said member and equipped at a point spaced from said end with an inwardly projecting annular flange, an annular member disposed within said flange, an nut in engaging relation to said flange and a part of the tube for effecting fluid tight association of the latter with said first named member, a split collar disposed outwardly of said second-named member in normally substantially snug engagement with the tube, and means operatively associated with said nut for effecting movement of said split collar along said tube and effecting contraction thereof to a predetermined limit during said movement thereof to a predetermined position on the tube, said means being further movable in the direction of said movement of said collar for frictionally retaining the same in a position from which it is incapable of return movement under the influence of vibration and temperature changes.

3. A conduit coupling comprising a member equipped with a seat for an end of a tube, a nut having threaded engagement at one end with said member and equipped at a point spaced from said end with an inwardly projecting annular flange, an annular member disposed within said nut in engaging relation to said flange and a part of the tube for effecting fluid tight association of the latter with said first named member, a split collar engaged in part in said second named member and within said nut, a second nut engaged with the first-named nut and with said collar for cooperation with said second named member to contract said collar about the tube.

4. A conduit coupling including in combination two members having threaded engagement with each other, one thereof equipped with a seat for the terminal flange of a tube, a ring element disposed within the other member, the latter equipped with an internal flange engageable with said ring member to force the same upon the tube flange, a split sleeve rotatable and slidable along the tube independently of the last-named member and disposed within the same, a sleeve nut equipped with a tapered bore and having thread connection with said last-named member, the tapered bore of said sleeve nut adapted to receive said split sleeve and effect contraction thereof as said nut is moved toward said ring element and rotated with respect to said split sleeve and said last-named member.

5. A coupling for flanged metal tubing including a threaded seat member, a sleeve nut engaged with and equipped between its ends with an inwardly projecting flange, a ring element disposed in engaging relation to said flange and between the same and said seat member, a radially contractible split sleeve mounted within said sleeve-nut between said ring element and the outer end of said nut, said split sleeve having a substantially cylindrical bore and having an outer double convex surface, and a second threaded sleeve nut having threaded engagement with the outer end portion of said first-named nut and equipped with a tapered bore within which the said split sleeve is received and contracted as said second nut is moved toward said ring element and is rotated with respect to said split sleeve, the engagement of said split sleeve with said tapered bore being along an annular line substantially midway between the ends of said split-sleeve.

6. A structure of the type specified comprising a seat member for the flange of a metal tube, a sleeve nut having thread engagement at one end with said seat member and equipped between its ends with an inwardly extending formation, a ring element disposed between said formation and the seat member and rotatable and longitudinally movable with respect to the latter and said nut, a tapered bore nut projecting into the other end of said sleeve nut, and a metallic split collar having a cylindrical bore and a double convex outer surface disposed between the said formation and said tapered bore nut and adapted to be contracted radially by the latter as the same is rotated in one direction, the width of the slot of said tube being such as to limit its said contraction to a predetermined inner diameter less than the outer diameter of the tube projecting through said nuts, said collar being rotatable with respect to both said nuts and the taper of the bore of the second named nut being substantially ten degrees to its axis.

7. In a coupling for flanged metal tubing comprising a member equipped with a seat for the tube flange, an unsplit collar disposed about the tube and upon the flange thereof, a radially contractible longitudinally non-collapsible split sleeve slidably mounted upon the tube for engagement with an end portion of said collar and provided with a cylindrical bore portion and a flared bore portion along the end portion thereof spaced from said collar and equipped with a longitudinal slot of predetermined width for limiting the contraction of its cylindrical bore portion to a diameter slightly less than that of the tube, a sleeve nut having threaded engagement with the seat member, and means within the sleeve-nut embracing and engaging said split collar for effecting contraction thereof and forcing the same into engagement with said collar as said sleeve-nut is rotated in one direction with respect to said seat member.

8. A conduit including a flanged metal tube, a seat member for the flange of the tube, a sleeve nut having threaded engagement with said seat member, means mounted within said nut and upon the tube for engaging the flange and body of the latter, said means including a radially contractible longitudinally non-collapsible resilient part slidable along the tube, and a means engaged with said nut and engageable with said first-named means to effect movement of the latter along the tube and contraction of said last-named part thereof to a predetermined degree into engagement with the tube body, the said first-named means equipped with a cylindrical bore portion and a flared bore portion, the latter being disposed along the outer end portion of the last-named part of said first-named means.

9. A conduit comprising a male member equipped with a seat for an end of a tube, a tube adapted to seat on said seat of said male member and equipped with an annular projecting shoulder element, a nut having thread engagement at one end with said male member and equipped at its other end with an inwardly projecting annular element, a split sleeve and an unsplit sleeve disposed within the nut in interengaging relation to each other, one of said sleeves being engaged with the annular element of said nut and the other thereof with the said shoulder element of the tube, and held engaged therewith by the interengagement of said sleeves under the influence of pressure exerted upon one thereof by the said annular element of the nut serving to effect contraction of the split sleeve at a point spaced from the shoulder element of the tube to grip said tube for resisting movement of same away from its seat, said split sleeve presenting an outer end portion spaced progressively farther from the tube from the portion of said sleeve which grips the latter, said spaced portion serving to diffuse vibration stresses on the free portion of said tube.

IRVING COWLES.